United States Patent
Nurse, Jr. et al.

(10) Patent No.: US 6,841,066 B2
(45) Date of Patent: Jan. 11, 2005

(54) FILTRATION DEVICE FOR A WASTE WATER TREATMENT SYSTEM

(75) Inventors: Harry L. Nurse, Jr., 12207 Plantation Blvd., Goshen, KY (US) 40026; John Christensen, Evansville, IN (US)

(73) Assignee: Harry L. Nurse, Jr., Goshen, KY (US)

(*) Notice: Subject to any disclaimer, the term of this patent is extended or adjusted under 35 U.S.C. 154(b) by 164 days.

(21) Appl. No.: 10/257,040

(22) PCT Filed: Apr. 5, 2001

(86) PCT No.: PCT/US01/11186

§ 371 (c)(1),
(2), (4) Date: Oct. 7, 2002

(87) PCT Pub. No.: WO01/76718

PCT Pub. Date: Oct. 18, 2001

(65) Prior Publication Data

US 2003/0209478 A1 Nov. 13, 2003

Related U.S. Application Data

(63) Continuation-in-part of application No. 09/544,200, filed on Apr. 6, 2000, now Pat. No. 6,306,299.

(51) Int. Cl.$^7$ ............................................. B01D 29/44
(52) U.S. Cl. ...................... 210/256; 210/299; 210/488; 210/532.2
(58) Field of Search ................................ 210/256, 299, 210/486, 487, 488, 532.2

(56) References Cited

U.S. PATENT DOCUMENTS

| | | | | |
|---|---|---|---|---|
| 2,900,084 A | * | 8/1959 | Zabel | 210/460 |
| 3,332,552 A | * | 7/1967 | Zabel | 210/488 |
| 4,710,295 A | * | 12/1987 | Zabel | 210/532.2 |
| 4,966,702 A | * | 10/1990 | Drori | 210/488 |
| 5,037,548 A | * | 8/1991 | Rosenberg | 210/488 |
| 5,176,829 A | * | 1/1993 | Drori | 210/488 |
| 5,249,626 A | * | 10/1993 | Gibbins | 210/488 |
| 5,382,357 A | * | 1/1995 | Nurse | 210/532.2 |
| 5,582,716 A | * | 12/1996 | Nurse, Jr. | 210/532.2 |
| 5,593,584 A | * | 1/1997 | Nurse, Jr. | 210/532.2 |
| 6,234,200 B1 | * | 5/2001 | Hall | 210/532.2 |

* cited by examiner

*Primary Examiner*—Christopher Upton
(74) *Attorney, Agent, or Firm*—Charles G. Lamb; Middleton Reutlinger

(57) ABSTRACT

A filter and housing (10) for waste water treatment includes a housing (10) having a plurality of coaxially mounted vertically extending sections adaptable to receive a filter cartridge therein. An upper section (12) is provided with an outlet consisting of at least two coaxially aligned rings (22) of preselected diameters wherein the thickness of the rings and the spacing between the rings is sufficient to receive waste water treatment outlets of different diameters. The filter cartridge is comprised of a stacked arrangement of a plurality of disc-dam units (32) wherein each disc-dam unit (32) is provided with a serpentine configured first dam (46), the first dam extending upwardly from an upper surface of the disc-dam unit, the first dam having terminating ends spaced at outer terminating edges (34a, 34b) of the disc dam unit to define a cord segment therebetween. The terminating ends are connected by a second dam (46) having a height less than the first dam. The serpentine configured first dam divides the disc-dam unit into an upstream side along the outer periphery and a downstream side along the inner periphery. Slots are positioned within the serpentine configured dam on the upstream side thereby providing flow communication with underlying disc-dam units. The top of the first dam is of a preselected height so as to provide a preselected spacing between the top of the first dam and the under surface of an overlying disc-dam unit.

12 Claims, 11 Drawing Sheets

FILTRATION DEVICE FOR A WASTE WATER TREATMENT SYSTEM

This application is a 371 of PCT/US01/11186 filed Apr. 5, 2001 which is a Continuation-in-part of non-provisional application Ser. No. 09/544,200 filed Apr. 6, 2000 now U.S. Pat. No. 6,306,299.

TECHNICAL FIELD

The present invention relates to a filter and filter housing for use in a waste water treatment system and more particularly relates to a sectionalized filter housing having capability of receiving filter cartridges of various lengths and is adaptable for connecting to water treatment tank outlet pipes of varying diameters.

BACKGROUND OF THE INVENTION

In the treatment of waste water, particularly in septic tanks, it is common to install filters to remove particulates being discharged from the tank which are generally undigested solids so that the discharging effluent is a relatively colorless and harmless liquid. There have been a number of filter units designed over the years for the removal of these undigested solids from the waste water prior to discharge from a septic tank or the like. For example, U.S. Pat. Nos. 2,900,084; 3,332,552; and, 4,710,295 to Robert Zabel teach a waste water treatment filtration system which includes a plurality of disc-dam units disposed in a stack, vertically spaced, in a super-imposed relationship such that the bottom of each overlying disc-dam unit cooperates with the upper edges of each underlying unit to form a horizontally elongated vertically narrow outlet slots. The stack of disc-dam units are mounted in a cylindrical housing with several slots located above and several slots located below the liquid operating level in a waste water tank. In operation, the digested waste water is received through a bottom opening of the housing and the discharging clarified effluent flows through a sidewall outlet which is in flow communication with an outlet from the waste water tank. However, it has been found that septic tanks or waste water treatment tanks come in different sizes and capacities and also the outlet discharge from the waste water tank is not of a standard size. Thus, for residential and commercial applications it is difficult to provide a filter housing unit of varying filtration capacities and with discharge outlets adaptable to mate with the various sizes of outlet discharge pipes or conduits from the waste water treatment tank.

SUMMARY OF THE INVENTION

It is an object of the present invention to provide a filter housing for a waste water treatment tank that includes a plurality of vertically extending interchangeable sections which allows for the design of a filter housing providing for a filtration system of different filtering capacities.

It is another object of the present invention to provide a filter housing have an outlet which is adaptable for mating with waste water treatment tank outlets of different sizes.

It is a further object of the present invention to provide a filter housing which is relatively inexpensive and easy to install.

It is even a further object of the present invention to provide a filter cartridge of disc-dam filter units in a filter housing that reduces turbulence during the upflow of waste water in the cartridge.

It is also an object of the present invention to provide a filter cartridge of disc-dam filter units wherein the discs have a diameter of less than ⅛" of the inside diameter of the filter housing.

More particularly, the present invention provides a filter and a housing for a waste water treatment system wherein the housing includes at least an upper section with an outlet for flow communication with a waste water treatment tank discharge outlet and a lower section with an open bottom to receive upward flow therethrough. The upper section is mounted above the lower section and there may be a plurality of middle sections mounted between the upper section and the lower section to accommodate filter cartridges of various lengths. Each of the sections of the housing include means to receive a plurality of disc-dam units therein. The plurality of disc-dam units in a stack arrangement define the filter cartridge with a longitudinally extending axis. Each of the disc-dam units is of a generally circular-shaped disc having an outer terminating edge, the base portion of each unit having a planar under surface and an upper surface with a first dam of serpentine configuration having a first and second terminating end. The dam which extends upwards from the upper surface of the base portion terminates in a dam top whereby a preselected distance is defined between the dam top and the under surface of an overlying disc. The first end and the second end of the dam define a cord segment therebetween, the dam dividing the base portion into an upstream and downstream side, the upstream side being along an outer periphery of the base portion and the downstream side being along an inner periphery of the base portion. The cord segment provides a cut out which extends from a second dam which connects the first and second ends of the outer terminating edge of the first dam wherein the second dam has a height less than the height of the first dam. Moreover, each of the discs are provided with a plurality of upstream openings in the upstream side of the base portion which are in flow communication with an adjacent underlying disc-dam unit. The flow through openings are generally positioned within the serpentine configured dam. The cut-outs of each disc are aligned to form an outlet flow chamber which is in flow communication with an outlet waste water treatment tank discharge outlet.

The lower section of the housing is provided with an inwardly extending sealing edge positioned for alignment with the disc-dam unit cut outs. The sealing edge is in contacting relation with the lowermost disc-dam unit wherein the sealing edge covers the cut out of the lowermost disc-dam unit thereby sealing the bottom of the outlet flow chamber from the incoming waste water to be filtered.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE DRAWINGS

Figure 1:
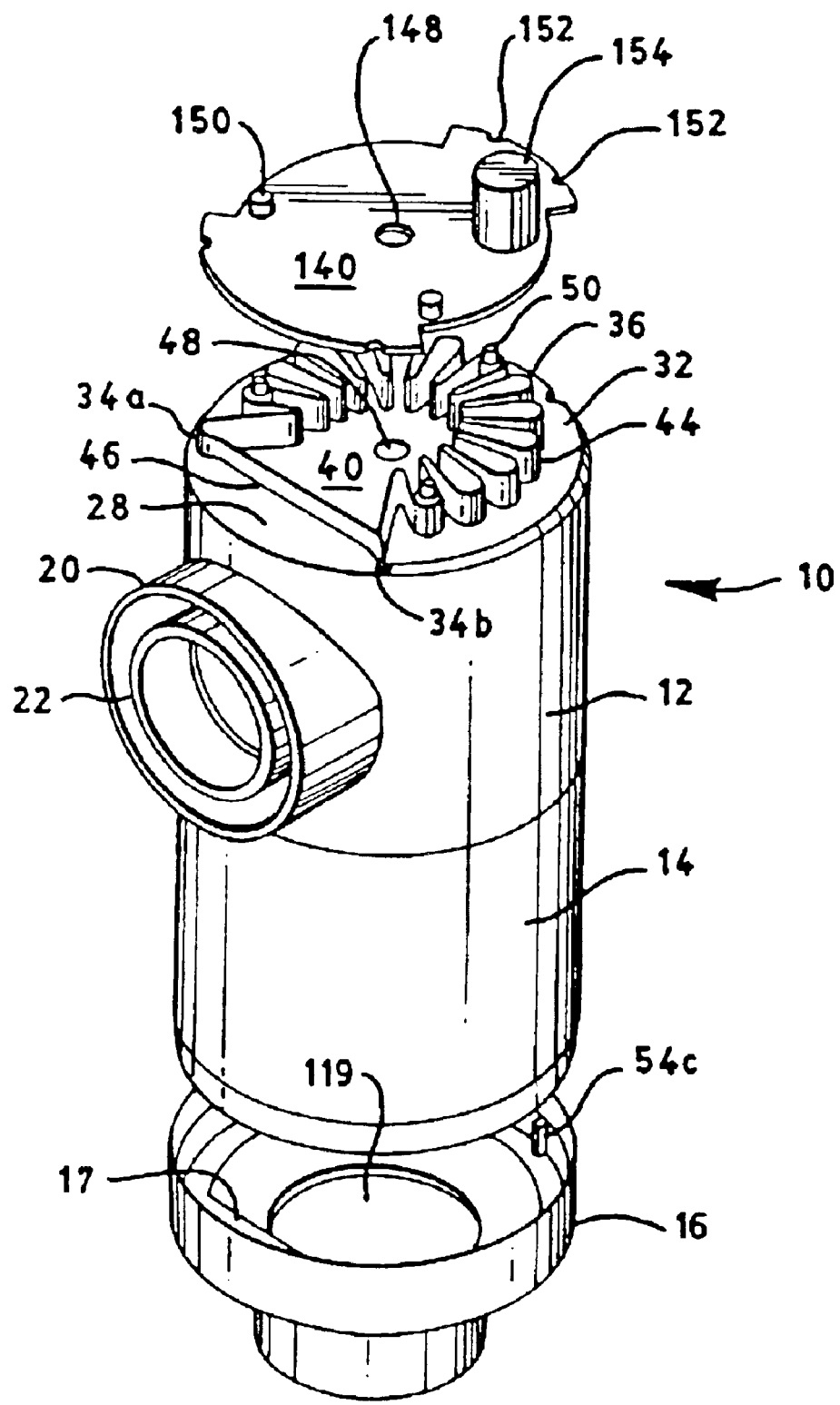
FIG. 1 is a perspective view, with selected portions shown exploded, of a preferred filter and housing of the present invention.

Referring to FIG. 1, which is an exploded perspective view of one preferred embodiment of the present invention, a filter housing 10 includes a plurality of sections mounted one on top of the other. As shown, the filter housing 10 is provided with an upper section 12 mounted above and onto a middle section 14 which, in turn, is mounted above and onto a lower section 16. Each of the sections are of the same diameter and are made of any suitable material, such as a thermo-plastic material, which is well known in the art. An outlet discharge is provided on the upper section and is generally comprised of a plurality of rings, such as rings 20 and 22, of a preselected size and thickness so that the outlet discharge from the upper section 12 can receive in a male or female arrangement a plurality of waste treatment discharge outlets of different diameters. Even though two rings 20 and 22 are shown, it is realized that additional rings may be provided at the outlet from the upper section 12 to accommodate even a larger number of waste water treatment outlets.

Figure 3:
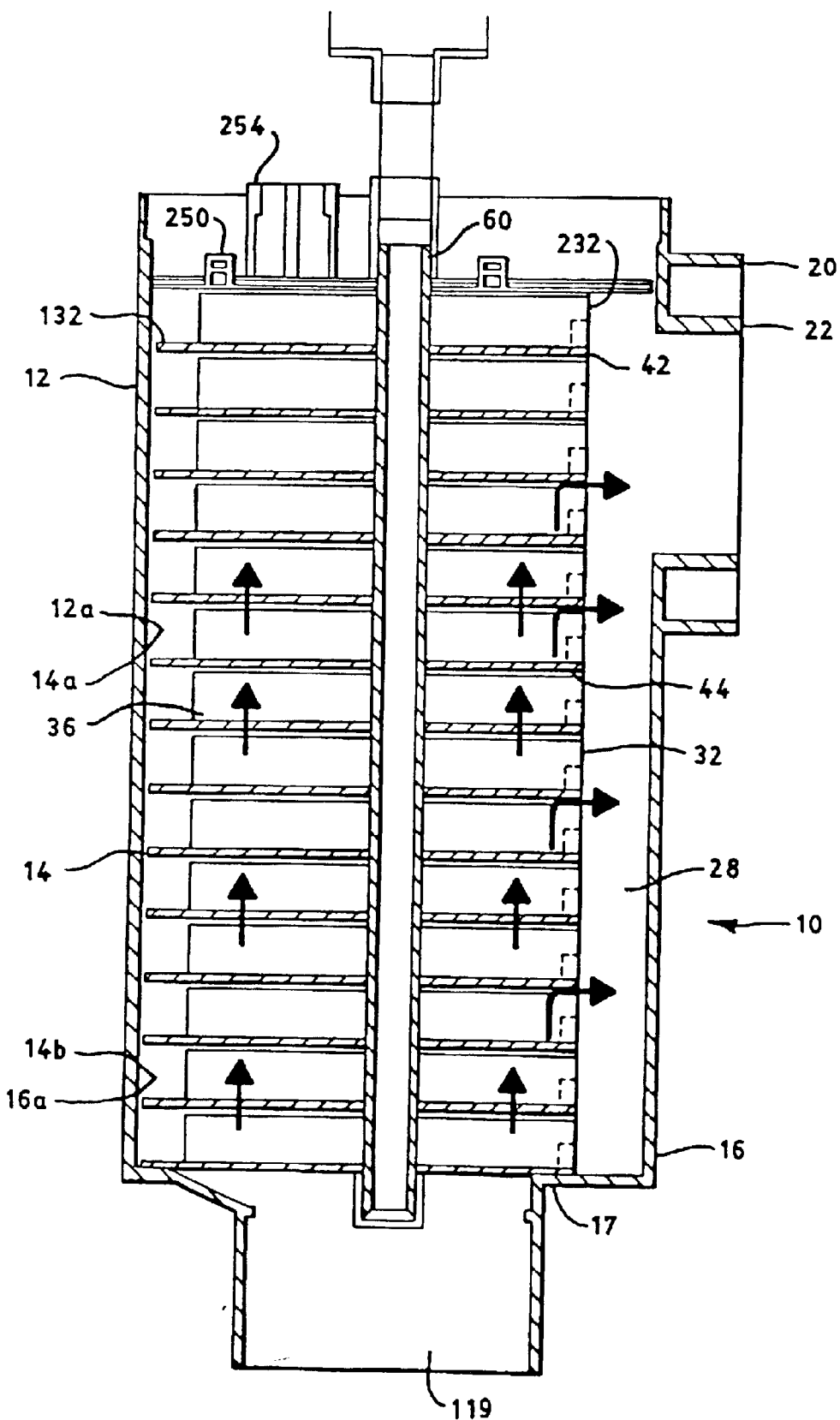
FIG. 3 is a side elevational view, in section, of the arrangement shown in FIG. 1 in assembled form.

Within the filter housing sections 12, 14, 16, a plurality of disc-dam units 32 are in a vertically spaced arrangement, as best shown in FIG. 3. A filter cartridge is comprised of a plurality of filter discs or disc-dam units 32 of generally circular cross section with a cut out cord section which is defined by a dam 46 which connects with terminating edges 34a and 34b of a serpentine configured dam 36 and the inner surface of the sections of the housing, such as upper section 12 as shown in FIG. 1. Each disc-dam unit is in parallel with overlying and underlying discs 32 with interlocking connectors 50 wherein the connectors 50 are of preselected configuration to provide a space between the dam top 44, and the under surface 42 of an overlying disc 32, as best shown in FIG. 3. The disc 32 is generally made of a suitable material, such as a thermoplastic material. Also, discs 32 have a diameter as close as possible to the inside diameter of the housing sections 12, 14, 16 as practical. The discs 32 diameter are generally within ⅛" of the inside diameter of housing sections 12, 14, 16 to prevent upflow of solids along the outer periphery of the filter cartridge.

Figure 2A:
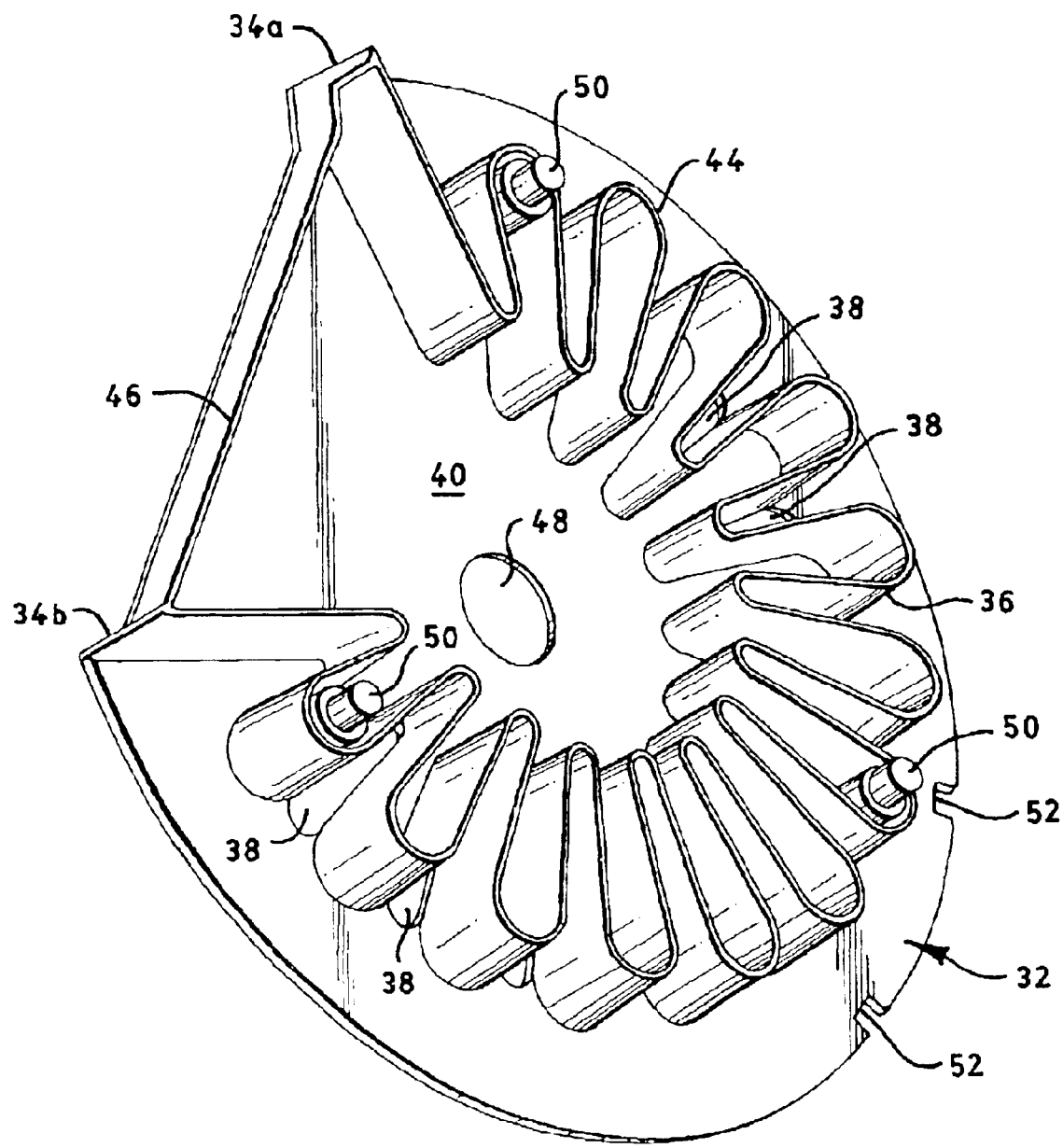
FIG. 2A is a perspective view of one preferred disc-dam unit of the present invention.
Figure 5A:
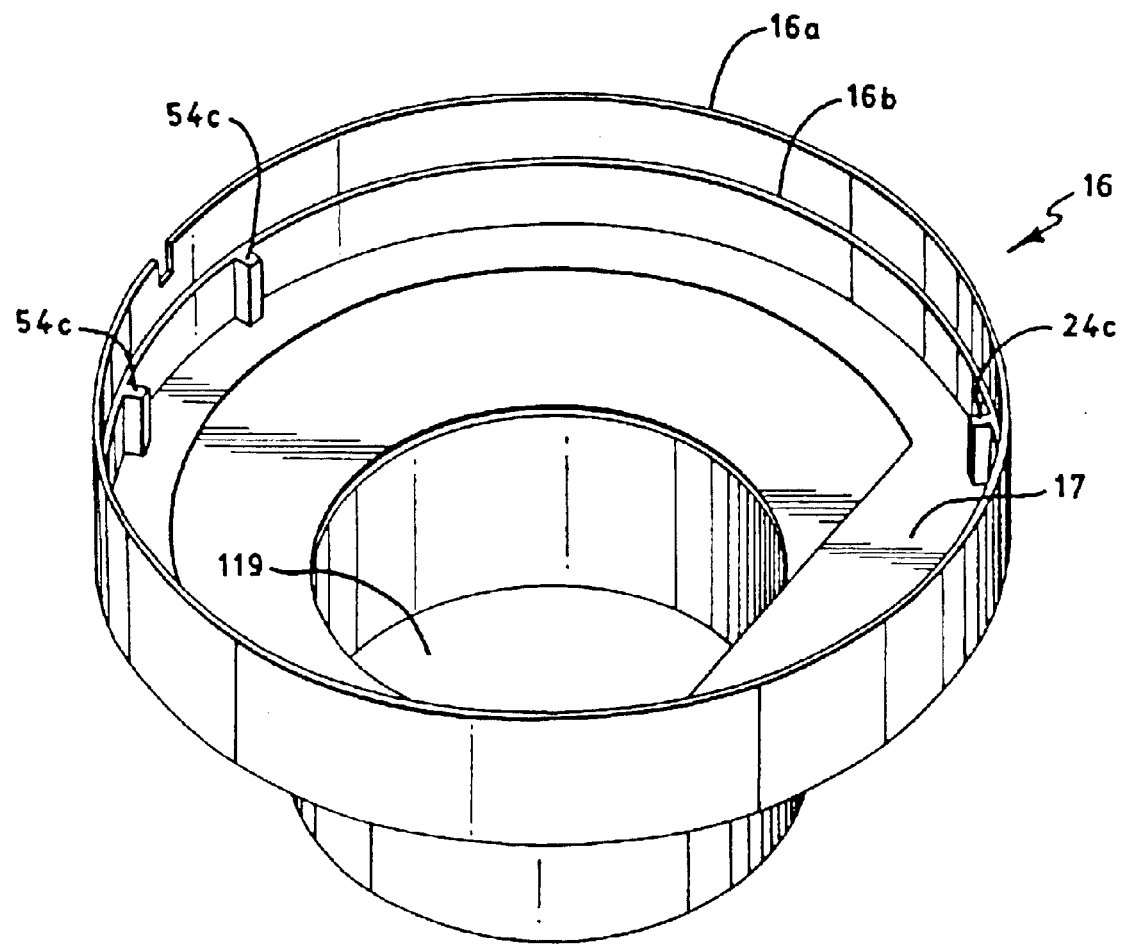
FIG. 5A is a perspective view of a lower section of the filter housing of FIG. 1.
Figure 5B:
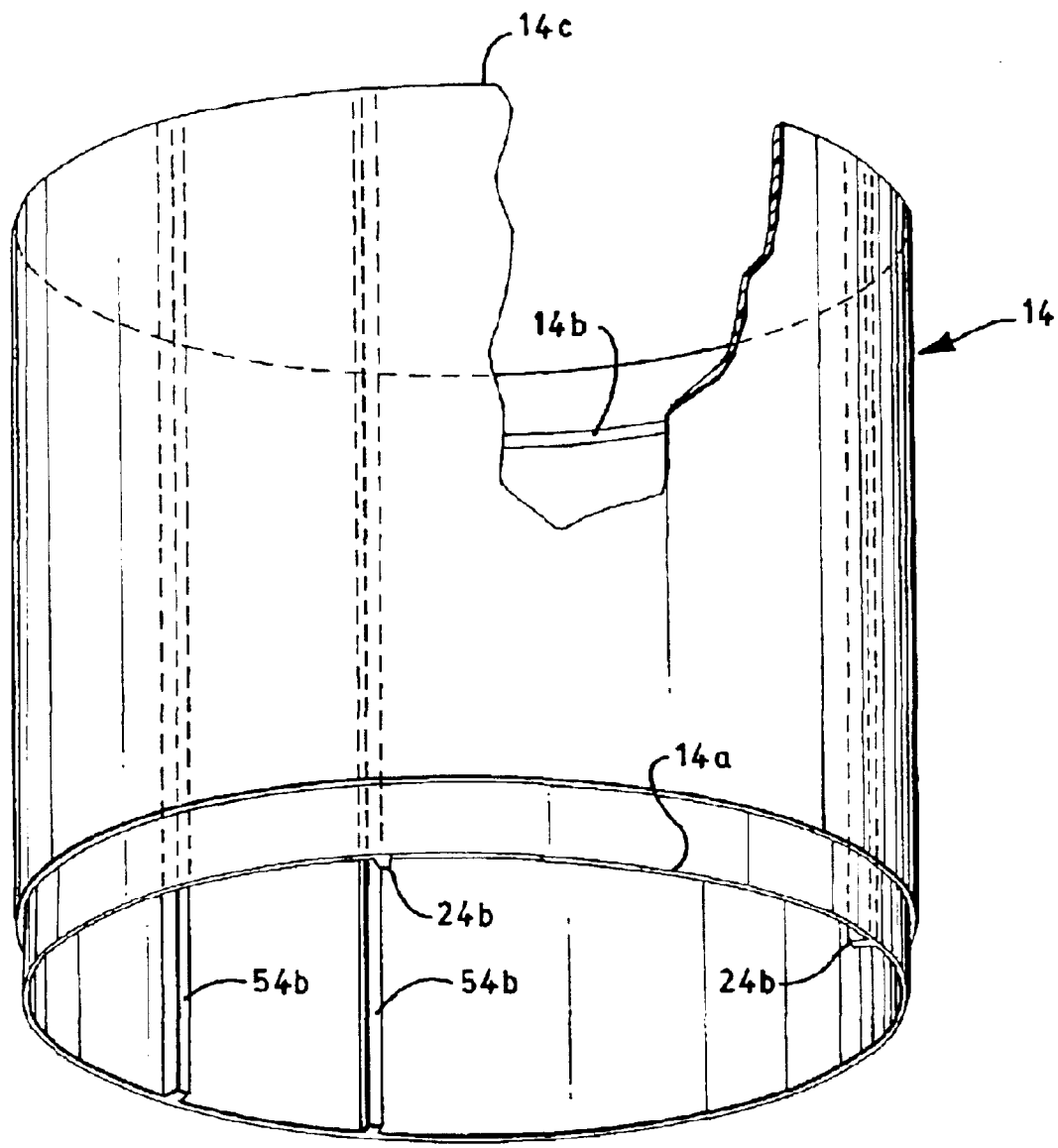
FIG. 5B is a perspective view of a middle section of the filter housing of FIG. 1 with selected portions shown in phantom lines.
Figure 5C:
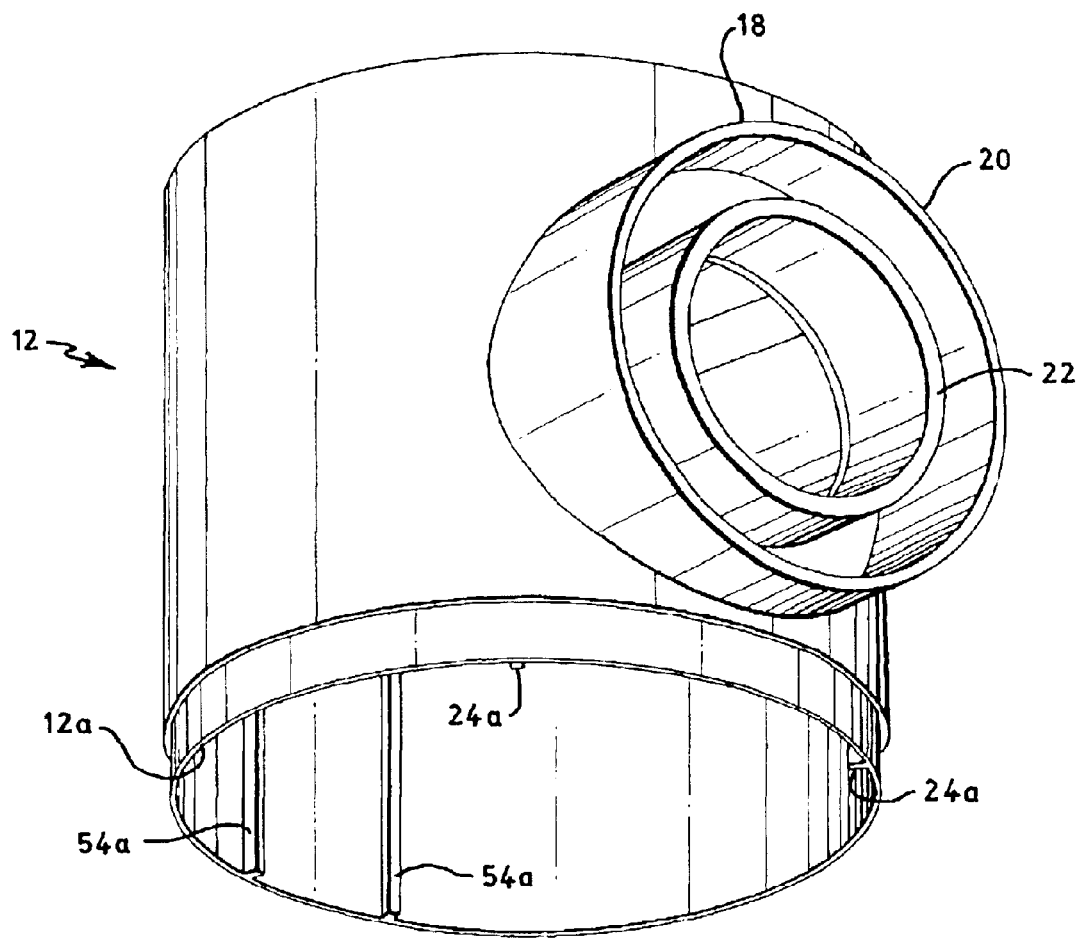
FIG. 5C is a perspective view of an upper section of the filter housing of FIG. 1.
Figure 6:
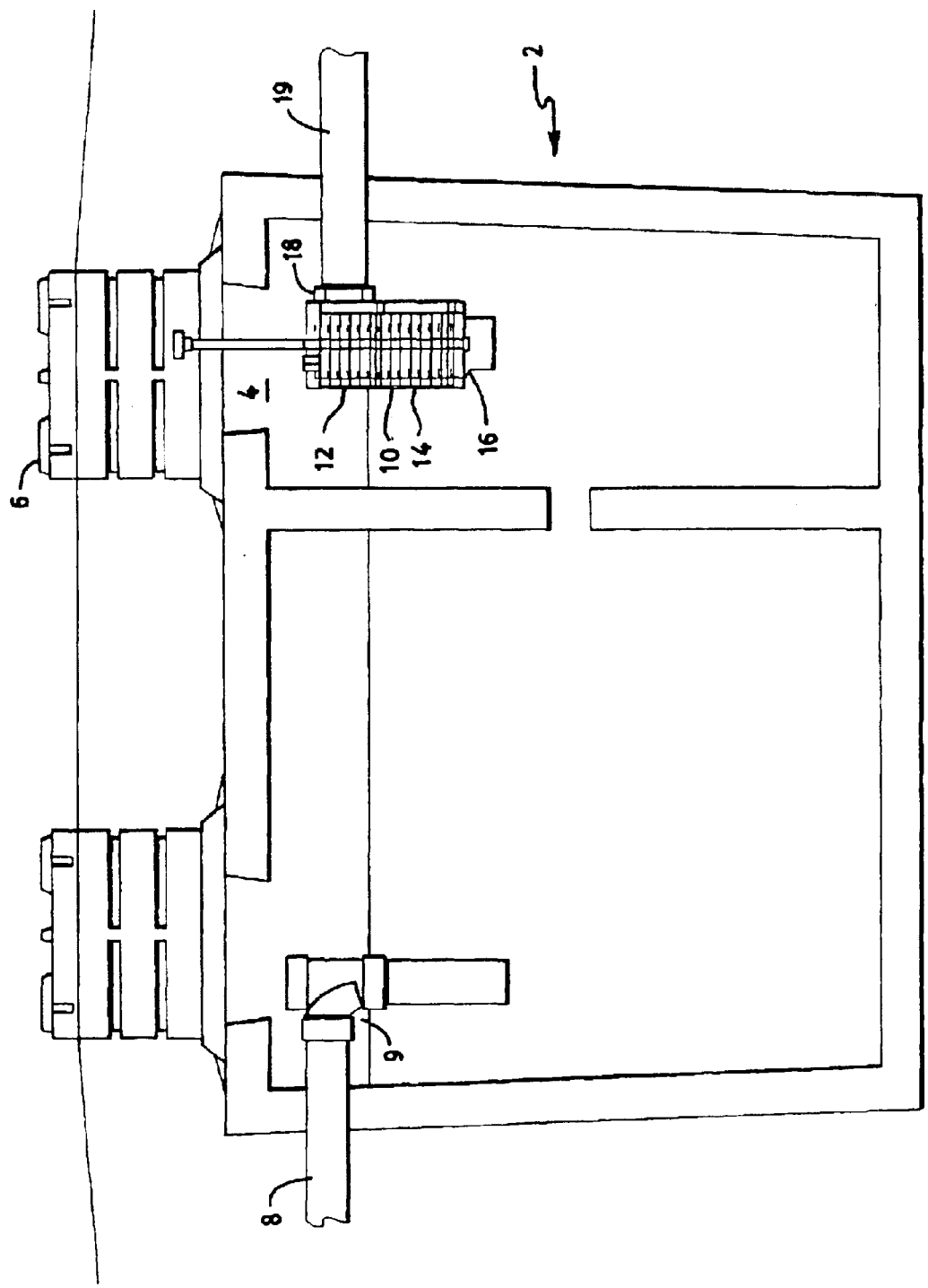
FIG. 6 is a view of the arrangement of the filter housing assembly shown in FIG. 1 in a waste water treatment tank.

As shown in FIG. 2A, a disc-dam unit 32 comprises an elongated over-flow dam 36 which extends from one of the edges identified as 34a or 34b to the other terminating edge 34a or 34b in a serpentine or sinuous path on the upper surface 40 of the disc 32. The dam 36 extends vertically upward a preselected distance and in a stacked arrangement defines a spacing between the top 44 of the dam 36 and the under surface 42 of the overlying disc 32. On one side of the dam 36 is an upstream portion which receives upwardly flowing non-filtered material through elongated slots 38 which are generally located within the curved portion of the sinuous path of the dam 36. Positioning the inlet slots 38 in the curved portion of the sinuous path provides an upwardly flowing flow path that is not subjected to turbulence as it flows vertically and over the top 44 of the dam 36 and into the downstream side which is defined by the inner periphery of the sinuous path of the dam 36. The outer periphery of the disc 32 and the outer surface of the dam 36 define the upstream portion. The serpentine configured dam 36 terminates with a terminating edge 34a at one end and with a terminating edge 34b at an opposed end. The terminating edges 34a and 34b are connected by a second or outlet dam 46 wherein the outlet dam is of a height less than the height of the serpentine configured dam 36. Thus, the flow of filtered fluid from the downstream side or inner portion of the disc overflows the dam 46 and into the outlet chamber 28 which is defined by the stacked arrangement of the discs 32 and the dam 46 terminating edges 34a and 34b in sealing relation with seal members 24a, 24b, 24c, as shown in FIGS. 5A, 5B and 5C. This arrangement defines the outlet chamber 28 for receiving the filtered waste water from the filter cartridge. The chamber 28 is in flow communication with the outlet 19 from the waste water treatment tank 19 (FIG. 6). Centrally located in each of the discs is an opening 48 to receive a support pipe 60 (FIG. 3) therethrough.

The discs 32 are also provided with notches 52 for engaging with lobes 54a, 54b, and 54c, of the filter sections 12, 14 and 16 (FIGS. 5A, 5B and 5C). The lobes 54a, 54b, and 54c, and the pipe 60 on which the disc-dam units 32 are mounted, in alignment with the interlocking connectors 50, provide for an easy assembly in stable relationship between the plurality of the disc-dams units 32 making up the filter cartridge in a use condition.

Figure 2B:
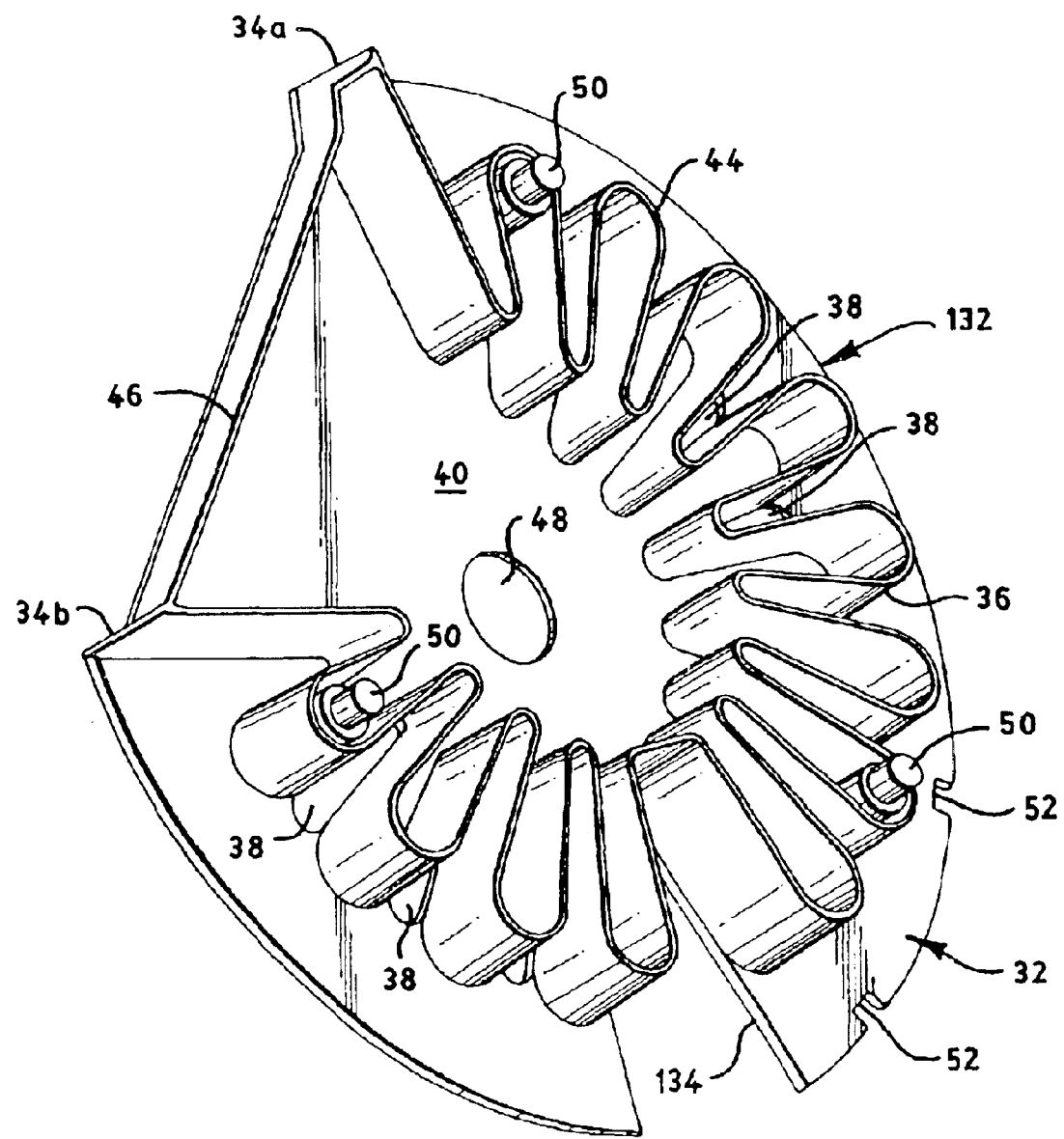
FIG. 2B is a perspective view of another disc-dam unit of the present invention.
Figure 2C:
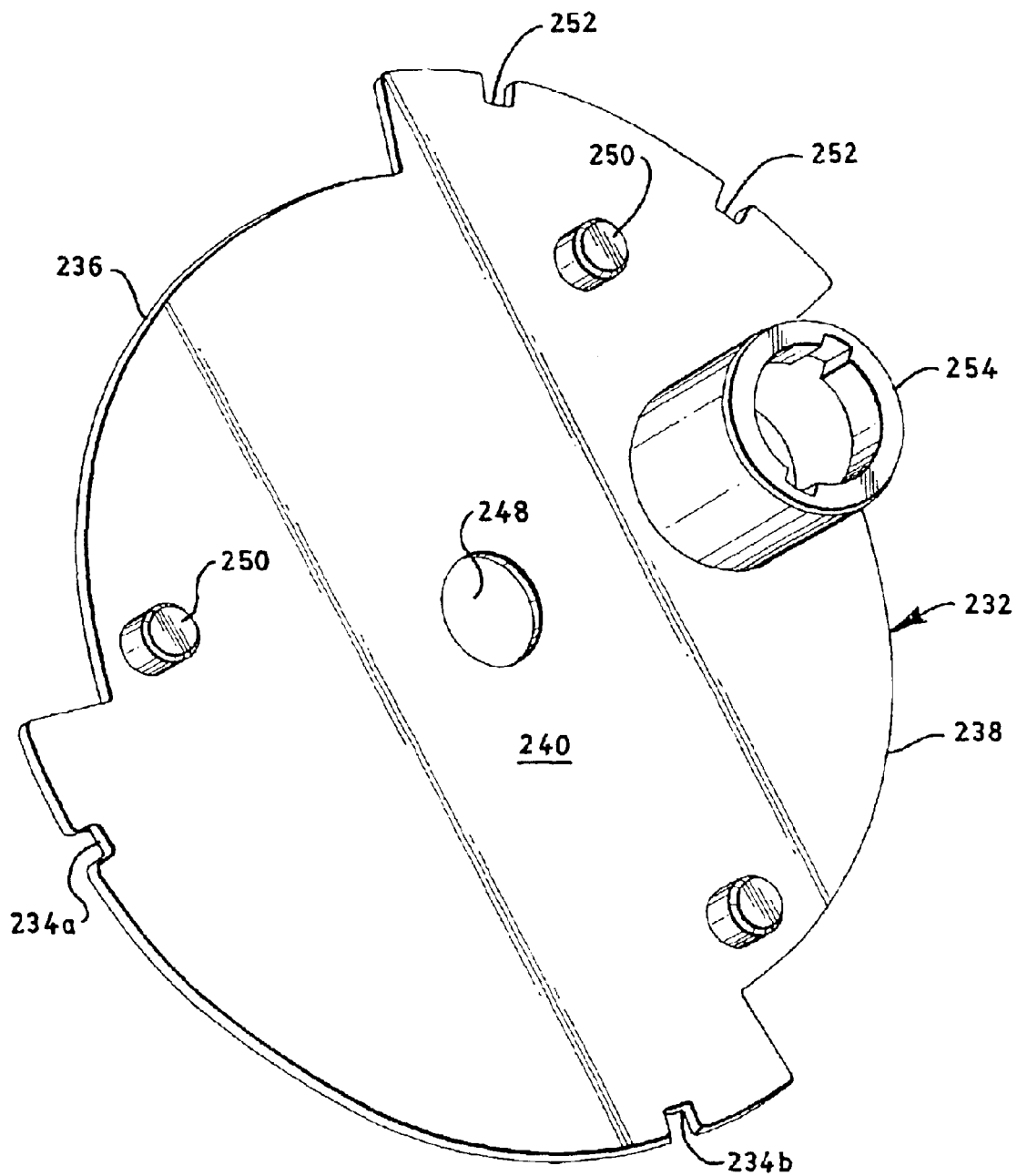
FIG. 2C is a perspective view of a lid for the filter cartridge of the present invention.

FIG. 2B shows a modification of the disc-dam unit 32 wherein the disc-dam unit in FIG. 2B is identified by the numeral 132 and the only difference is the cut out segment 134. In particular, disc-dam unit 132 is generally positioned in the upper portion of the upper section 12 for receipt of a level alarm, level indicating device, or the like, which may be placed within the incoming discharge waste water into the filter cartridge. When a level indicator, level control, level alarm, or the like, is utilized, the top plate, as shown in FIG. 2C, is utilized as the top disc of a filter cartridge. This disc, identified by numeral 232, is provided with a planar surface 240 with an opening 248 therein to receive the pipe 60 therethrough. Notches 252 are provided for engagement with the lobes 54c, particularly in the upper section 12. Connectors 250 are also provided for alignment and inner connecting with the disc 232 and an underlying disc 132. Moreover, cut-outs 234a and 234b are provided for alignment with terminating edges 34a and 34b of the discs 32 and 132 and are received by the sealing members 24c in the upper filter housing section 12. Cut-outs 236 and 238 are also provided in case of an overflow so that the disc 232 does not have an overflow of waste water in case the liquid level exceeds the top of the filter cartridge.

Upwardly extending coupling 254 is provided to receive the level control, level alarm, level indicating means and the like. The coupling 254 is in alignment with the cut-out 134 in the disc 132.

FIGS. 5A, 5B and 5C show the details of the three different sections which make up the housing of the filter housing 10. Each of the housing sections 12, 14 and 16 have means to connect to one another in a stacking arrangement. In a preferred embodiment, at least an upper section 12 is mounted to a lower section 16. For units which require filter cartridges longer than the filter cartridge which can be arranged in a spaced stacked arrangement in the two sections 12 and 16, middle filter housing sections 14 are provided; and, any number of sections 14 may be added to the stacking arrangement and is only defined by the vertical height of the filter cartridge as desired by the user.

Figure 4A:
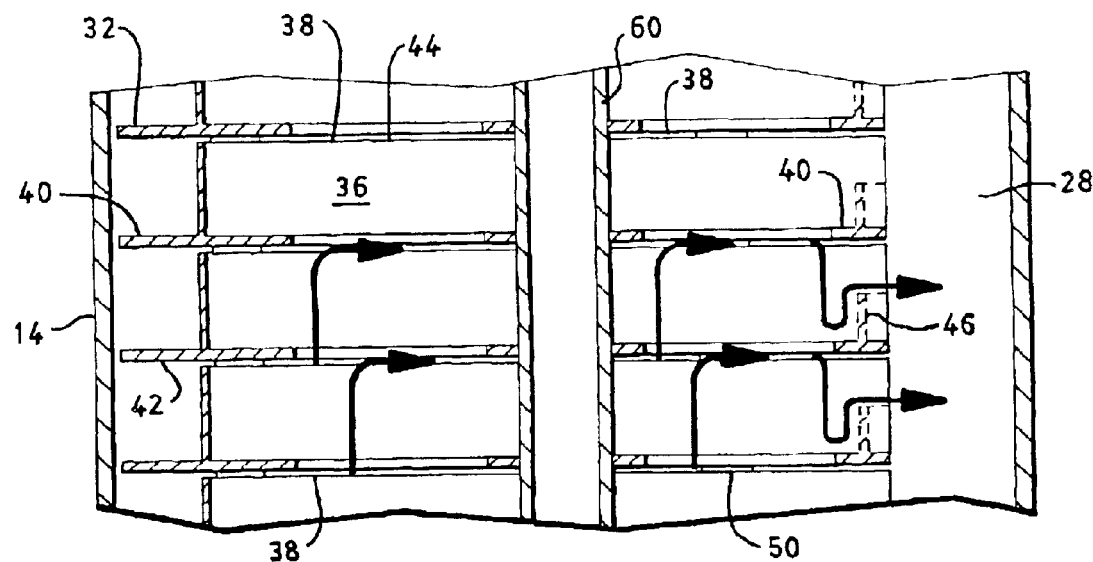
FIG. 4A is an enlarged segmental view showing a method of operation of the filter assembly shown in FIG. 1.
Figure 4B:
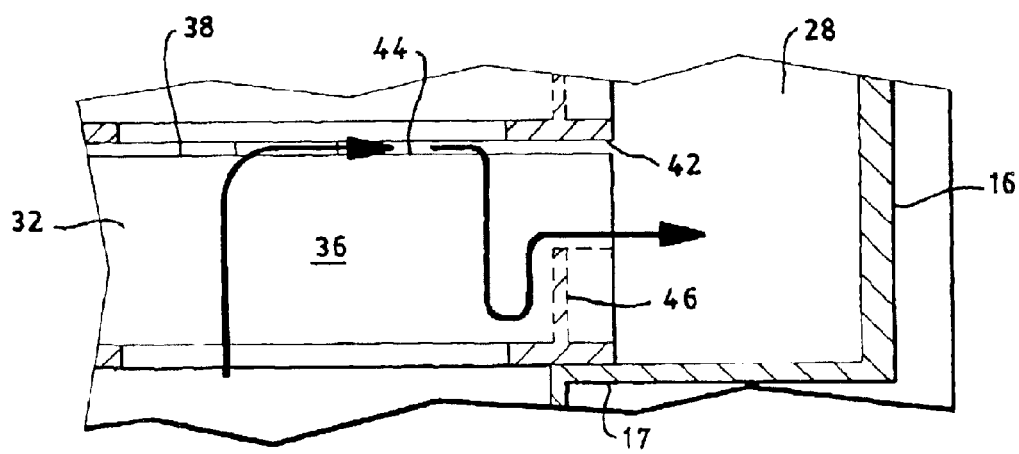
FIG. 4B is an enlarged segmental view of the orientation of the discs of the present invention received within the lower section of the housing, as shown in an assembled unit of FIG. 1.

In FIG. 5A, the lower section 16 is provided with inwardly extending seal 17 which, as shown in FIG. 4B, receives the second dam 46 thereon to prevent the flow or the intermingling of filtered effluent in the chamber 28 with the incoming waste water flowing upwards through the opening 119. The lower section 16 is provided with lobes 54c which are for alignment with lobes 54b in lower section 14 and lobes 54a in the upper section 12. The upper portion of the lower section 16 is provided with an inwardly extending step 16b which receives the lower terminating edge 14a of the middle section 14 or the lower terminating edge 12a of the upper section 12. The lower terminating edges 12a and 14a are of a reduced diameter from the diameter of the exposed outer surface of the remainder of housing portions 12 and 14, respectively. Moreover, the vertical height of the lower terminating edges 12a and 14a are the same distance as the distance of the upper terminating edge 16a from section 16 from step 16d. And, in a stacked arrangement the outside or exposed outer surface of the diameter of the housing is of the same diameter from the upper section to the lower section.

As shown in FIG. 5B, the middle section is provided with lobes 54b which are for alignment with the lobes 54c and 54a and the seal members 24b which extend vertically along the inner surface of the cylindrical housing section. As shown in the cut-out, middle housing section 14 is provided with a step 14b which is a preselected distance from the terminating edge 14c to receive the lower terminating edge 14a of a middle filter housing section 14 or the lower terminating edge 12a of an upper housing section 12.

As shown in FIG. 5C, an upper section 12 is provided with the outlet 18 which is comprised of a plurality of rings 20 and 22 to attach to a waste water treatment tank outlet 14. Upper section 12 is also provided with lobes 54a for alignment with lobes 54b and 54c and engagement with the cut-outs 52 in the discs 32, 132. Sealing members 24a are also provided for engagement with the terminating edges 34a and b of the disc 32.

Figure 7:
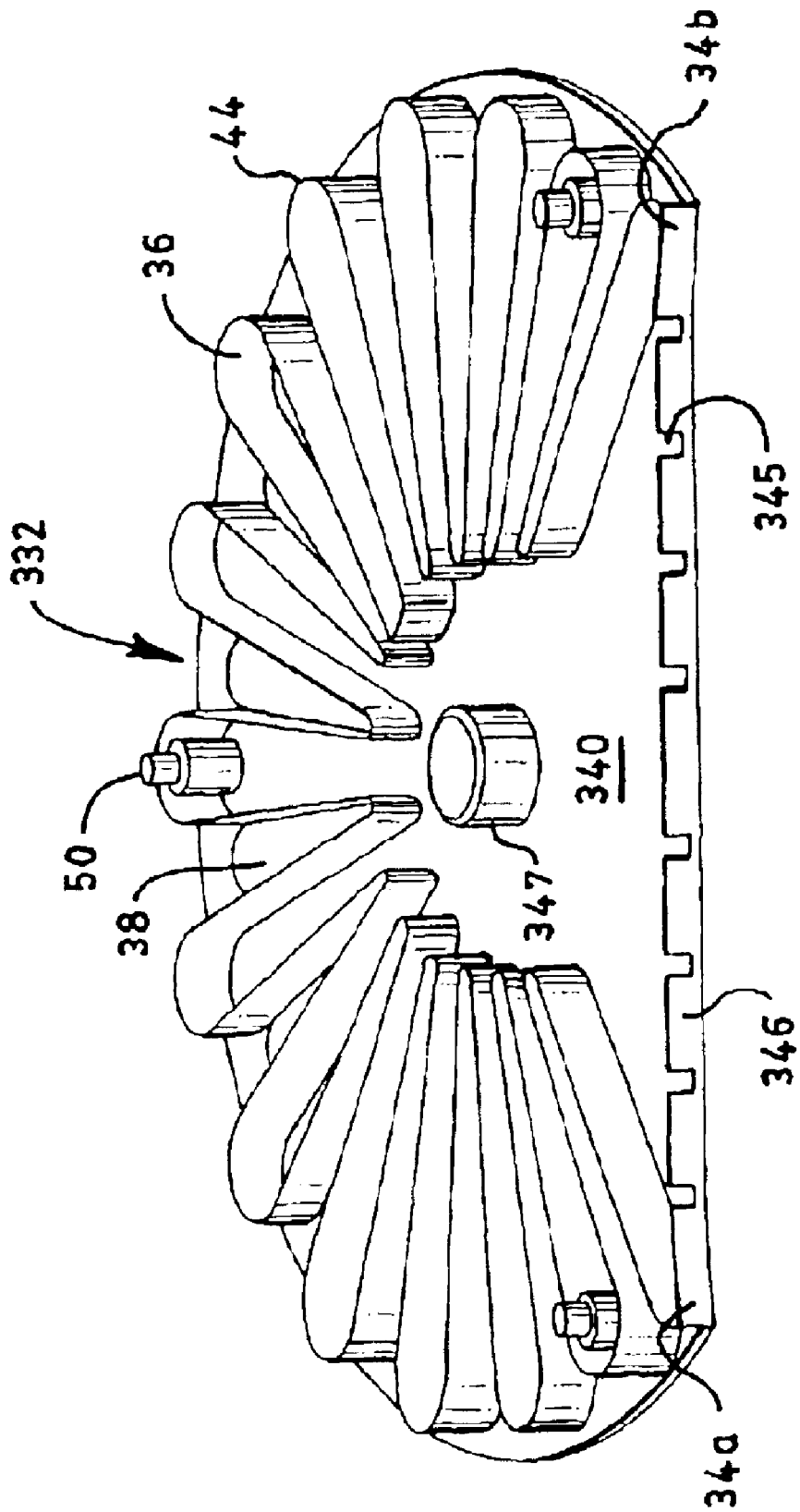
FIG. 7 is a perspective view of another embodiment for a disc-dam unit of the present invention.

An alternative disc filter element 332 is depicted in FIG. 7. As can be seen therein, first filtering dam 36 extends upward from base portion or planar surface 340. First filtering dam 36 is again of serpentine construction. Flow through apertures 38 are formed through base portion 340 and are formed between the serpentine curvatures of the first dam. The serpentine curvatures extend the length of the first dam 36 between first end 34a and second end 34b.

Second dam or weir 346 is similarly provided extending between the first and second end 34a, 34b of the first dam. The first dam 36 extends between the flow through apertures 38 and the second dam 346. The second dam 346 is provided in order to reduce the flow rate of the water passing through the filter element 332 which is stacked in a plurality within the filter housing. Fluid passing through the disc-dam filter element 332 first is filtered through apertures 38, causing particulate material to sluff downward through the vertical column defined by the apertures 38 and the plurality of units stacked together, as mentioned above. A plurality of vertical notches 345 are formed in the second dam in order to allow fluid therein to drain appropriately into chamber 28 and outlet discharge 19 depicted in the other Figures. Notches 345 ensure that no fluid remains undrained in the central portion of base section 340 after removal of the stacked filter unit. Notches 345 are approximately $5/32$ inch in width in order to properly filter retain larger particles on base portion 340. Notches 345 act to allow water to flow over planar base portion 340 at a slower rate than if the weir or second dam 346 were not present. Further, the slower flow rate causes material suspended in the fluid to separate and come to rest on the base portion 340. Each of the filter elements 332 are vertically stackable upon one another by the interlocking connectors 50 which separate each of the base portions 340 and top edge 44 of first dam by a slight gap to allow filtered fluid therethrough.

By placement of the notches 345 in second dam 346, fluid contained or trapped therein will drain appropriately. This will be particularly the case with the filter sections are removed from the housing. Upward lifting of the stacked filter sections causes the fluid to drain from the individual disc filter element 332 such that removal of the stacked filter elements will not also remove corresponding amounts of fluid from the filter housing. Additionally, as depicted in FIG. 7, cylindrical bore support member 347 is provided to extend upwardly and downwardly from the base portion 340 in order to provide an additional support area for each filter disc-dam unit 332 and receive support pipe 60. Thus, the units have four support points, each of the three interlocking connectors 50 and the bore support member 347.

In operation, as shown in FIGS. 3, 4A, 4B and 6, waste water enters the waste water treatment tank 2 through a waste water inlet 8. Tank 2 generally includes at least one or more openings therein identified by the numeral 4 with a cover 6 thereover which provide for entrance to the tank. At least one opening 4 is shown in alignment with a filter housing 10 for easy removal of the sections 12, 14, 16 or discs 32 in filter housing 10. The waste water entering the tank 2 fills until the level 9 is reached which is in alignment with the waste water discharge outlet 19. The flow of the waste water is up through the lower filter section 16 and is discharged through the outlet 18 in the upper section 12. As the waste water discharge flows into the filter housing through the opening 119, the waste water, as shown by the arrows, moves upwardly adjacent to the central portion of the cartridge unit through the slotted openings 38 in the discs 32. The waste water flowing upwards through the slots 38 provides for the settling of the particles, which flow downwardly through the slots 38, as the rising waste water moves upwardly through the slots 38 and over flows the top edges 44 of the dams 36. Spacing between the top edge 44 and the under surface 42 of an overlying disc 32 is of a preselected distance, generally less than an $1/8$", so that only very small particles have the opportunity to overflow the top edge 44. Overflowing waste water is filtered at the selected spacing between the under surface 42 and the top edge of the underlying dam top 44 so that relatively clean water exits, into the chamber 28 and out through the outlet discharge 19. By arranging the slots 38 in the curvature of the serpentine configured dam 36 there is little to no turbulence and the turbulence is minimized at the dam top 44 overflow. Also, it has been found that this reduced turbulence promotes "sluffing" at the interior column because of this lack of turbulence created by the water moving across the upstream surface of the disc as the dynamics of the water is flowing in a vertical condition and not in a vertical and horizontal condition.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A wastewater treatment filter comprising:
   a plurality of stackable filter elements, each of said elements having
   a base portion having a plurality of flow through apertures formed therethrough;

a first filtering dam and a second filtering dam;

at least one interlocking connector extending upward from said base portion;

wherein said first dam extends between said flow through apertures and said second dam.

2. The filter of claim 1 wherein each of said filter elements further comprises at least one flow through notch formed in said second dam.

3. The filter of claim 1 wherein said first dam extends upwardly from said base portion and has a first end and a second end.

4. The filter of claim 3 wherein said second dam extends between said first and said second end of said first dam.

5. The filter of claim 4 wherein said first dam has a vertical height which is less than the vertical height of said at least one interlocking connector.

6. The filter of claim 5 wherein said second dam has a vertical height which is less than said vertical height of said first dam.

7. The filter of claim 6 wherein said vertical height of said second dam is about one-half the vertical height of said first dam.

8. The filter of claim 4 wherein said base portion is a circular shaped disc.

9. The filter of claim 3 wherein said first dam is a serpentine configured dam.

10. The filter of claim 9 wherein said second dam extends between said first end and said second end of said serpentine dam.

11. The filter of claim 9 wherein said flow through apertures are each formed between curvatures formed in said first dam.

12. The filter of claim 1 further comprising a support bore extending upward and downward from said base.

* * * * *